(12) United States Patent
Yang et al.

(10) Patent No.: US 7,380,971 B2
(45) Date of Patent: Jun. 3, 2008

(54) BACKLIGHT MODULE

(75) Inventors: Xing-Peng Yang, Beijing (CN);
 Ying-Bai Yan, Beijing (CN); Guo-Fan Jin, Beijing (CN)

(73) Assignees: Tsinghua University, Beijing (CN);
 Hon Hai Precision Industry Co., Ltd.,
 Tu-Cheng, Taipei Hsien (TW)

( * ) Notice: Subject to any disclaimer, the term of this patent is extended or adjusted under 35 U.S.C. 154(b) by 87 days.

(21) Appl. No.: 11/449,930

(22) Filed: Jun. 9, 2006

(65) Prior Publication Data

US 2006/0291250 A1 Dec. 28, 2006

(30) Foreign Application Priority Data

Jun. 10, 2005 (CN) .......................... 2005 1 0035276

(51) Int. Cl.
 *F21V 7/04* (2006.01)
(52) U.S. Cl. ..................... 362/622; 362/608; 362/612; 362/627
(58) Field of Classification Search ................ 362/600, 362/608, 612, 613, 621–622, 627
 See application file for complete search history.

(56) References Cited

U.S. PATENT DOCUMENTS

| 4,936,659 | A | * | 6/1990 | Anderson et al. | ............. 349/64 |
| 5,709,447 | A | * | 1/1998 | Murakami et al. | .......... 362/621 |
| 6,048,071 | A | * | 4/2000 | Sawayama | .................. 362/603 |
| 6,805,468 | B2 | * | 10/2004 | Itoh et al. | .................... 362/362 |
| 6,991,359 | B2 | * | 1/2006 | Leu et al. | .................... 362/624 |
| 7,101,070 | B2 | * | 9/2006 | Yu et al. | ..................... 362/558 |

* cited by examiner

*Primary Examiner*—Ali Alavi
(74) *Attorney, Agent, or Firm*—Jeffrey T. Knapp (57) ABSTRACT

A backlight module includes a light guide plate having an incident surface, an emitting surface adjacent to the incident surface, and a reflective surface opposite to the emitting surface. At least one light source is disposed adjacent the incident surface. The light source has a luminescent surface; and at least one reflecting device is disposed adjacent the light source. The reflecting device has a reflective surface facing the incident surface. At least one semi-transmissive and semi-reflective film disposed on the incident surface of the light guide plate. The semi-transmissive and semi-reflective film and the reflecting device together are disposed for cooperatively reflecting some (i.e., a fraction) of the light beams emitted from the light source and redirecting the fraction of the light beams into the light guide plate through the incident surface, distant from the light source.

10 Claims, 7 Drawing Sheets

BACKLIGHT MODULE

RELATED APPLICATIONS

This application is related to a commonly-assigned copending application entitled, "BACKLIGHT MODULE AND REFLECTOR THEREOF", filed Jun. 16, 2006 application Ser. No. 11,454,550. The disclosure of the above-identified application is incorporated herein by reference thereto.

BACKGROUND

1. Technical Field

The invention relates generally to backlight modules and, more particularly, to an edge-lighting backlight module for providing a planar illuminating light to a liquid crystal display (LCD) device.

2. Discussion of Related Art

With the extensive application of liquid crystal displays (LCDs) in electronic display devices, the requirement for effective and efficient liquid crystal display devices increases rapidly. In a liquid crystal display device, a liquid crystal is a substance that does not itself radiate light. Instead, the liquid crystal relies on receiving light from a light source to thereby display images and/or data. In the case of a typical liquid crystal display device, a backlight module powered by electricity supplies the needed light. A conventional backlight module can be divided into two types, i.e., a direct type and an edge type, according to the location of the light sources. In an edge-type backlight module, the light sources are located facing the incident surface of light guide plate. Such edge-type backlight modules are widely used in LCD devices. Light beams emitted from the light sources are optically coupled into the incident surface, enter the light guide plate, advantageously reflected, as needed, by the microstructure of the back reflective surface, and then transmitted out from the emitting surface uniformly to illuminate an LCD panel.

Figure 8:
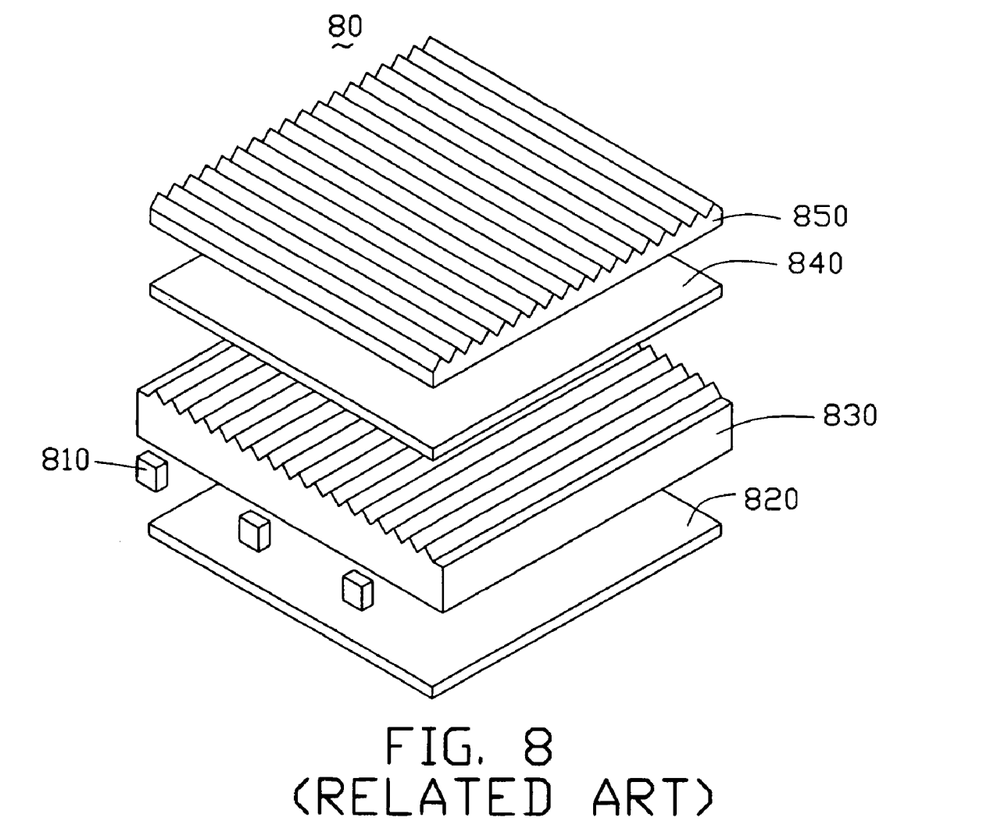
FIG. 8 is an isometric view of a conventional backlight module.

FIG. 8 (Prior art) represents a conventional edge-lighting type backlight module 80. The backlight module 80 includes a light source 810, a reflective plate 820, a light guide plate 830, a diffusion sheet 840, and a prism sheet 850. The light source 810 is positioned adjacent an incident surface of the light guide plate 830. The reflective plate 820 is located below the light guide plate 830 and is configured for reflecting light beams that is emitted from a bottom surface of the light guide plate 830 into the light guide plate 830. The diffusion sheet 840 is located above the light guide plate 830 and is configured for uniformly diffusing the emitted light beams. The prism sheet 850 is positioned above the diffusion sheet 84 and is configured for collimating the emitted light beams, thereby improving the brightness of illumination. The backlight module 830 can use, e.g., cold cathode fluorescent lamps (CCFL) or light emitting diodes (LED) as the light source 810.

Figure 9:
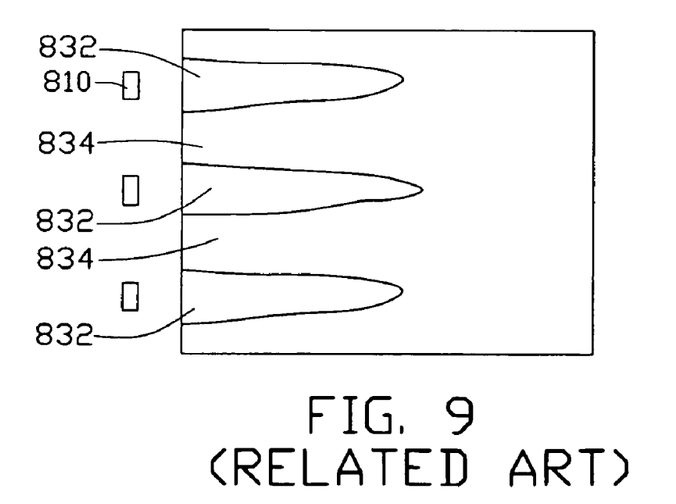
FIG. 9 is schematic view showing a light column appearing in the backlight module of FIG. 8.

A small-sized backlight module usually uses at least one LED as a light source and a large-sized backlight module usually uses a CCFL as a light source. Advantages of LED usage over CCFL usage include the following. Firstly, the LED has a long life, a bright color, and a high reliability. Secondly, the LED is not harmful to the environment, while the CCFL potentially is because of the presence of mercury in the fluorescence tube thereof. So, it may be a development trend that LEDs are used as the preferred light source of edge-type backlight modules. However, referring to FIG. 9, when LEDs are used in the backlight module as the light source 810, a number of bright areas 832 may be occur in areas adjacent to the light source 810, and a number of dark areas 834 may appear between neighboring bright areas 832. Therefore, a light column phenomenon formed by the bright areas 832 and the dark areas 834 can occur due to the restriction of a light emitting angle of LEDs. This phenomenon reduces light distribution uniformity.

Figure 10:
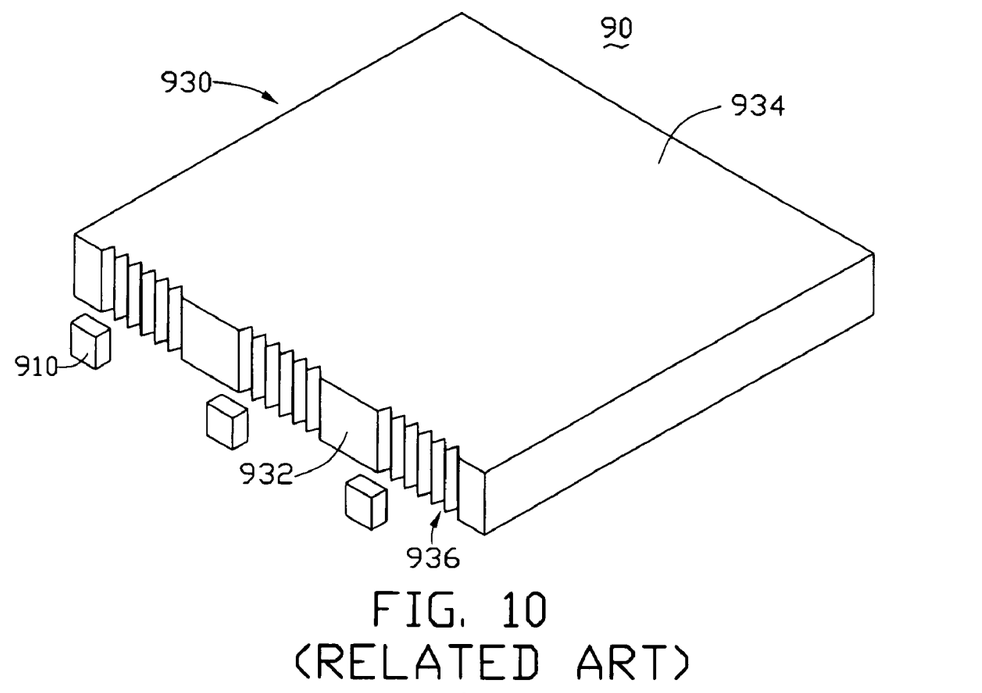
FIG. 10 is an isometric view of another conventional backlight module.

Referring to FIG. 10, another conventional backlight module 90 is shown. The backlight module 90 includes a plurality of LEDs 910 and a light guide plate 930. The light guide plate 930 includes an incident surface 932 facing the LEDs 910, an emitting surface 934 adjoining the incident surface 932, and a plurality of light diffusing portions 936 defined in the incident surface 932, spatially corresponding to the LEDs 910. The light diffusing portions 936 has a plurality of V-shaped grooves arranged regularly and periodically in a direction perpendicular to the emitting surface 934. Light beams incident on the light diffusing portions 936 are scattered. The diffusing portions 936 can thereby reduce the area of dark areas formed adjacent the incident surface 932.

Figure 11:
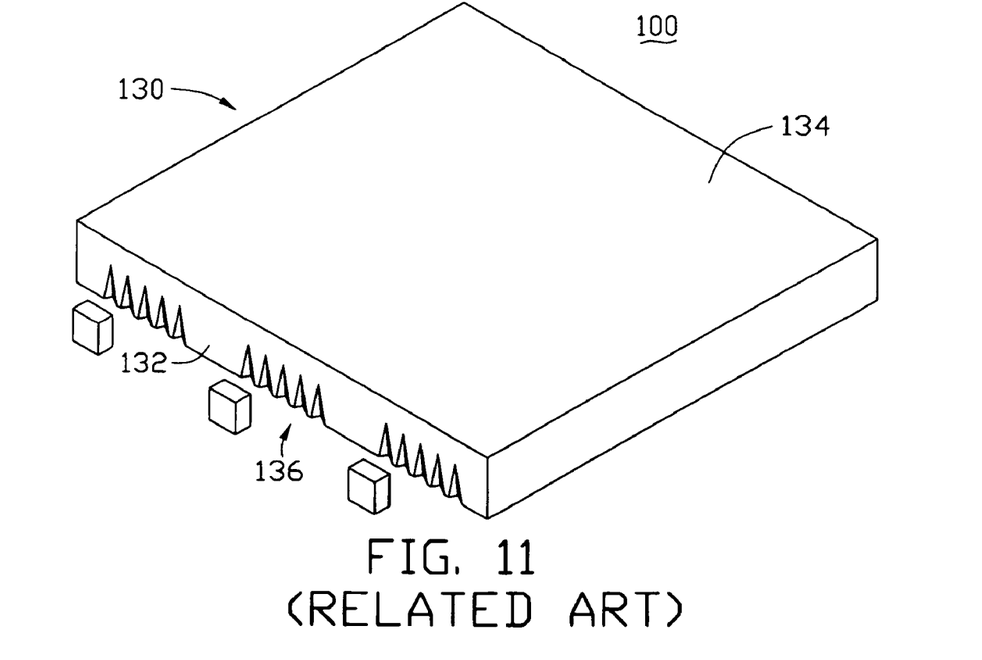
FIG. 11 is an enlarged view showing part of light diffusing portions of the backlight module of FIG. 10 and a light path associated therewith.

FIG. 11 shows that a light beam is refracted into the above-described light guide plate 930 through the incident surface 932 having a plurality of diffusing portion 936. According to the Fresnel formula of reflection and deflection, a deflection angle β can be defined by the following equation:

$$\beta = 90 - \frac{\alpha}{2} - \arcsin\left(\frac{\sin(90 - \frac{\alpha}{2})}{n}\right),$$

wherein α is the vertex angle of V-shaped grooves of the diffusing portion 936, and n is a refractive index of the light guide plate 90. The deflection angle β cannot be greater than or even equal to 90 degrees, according to the equation. For example, if the light guide plate 90 is formed of polymethyl methacrylate (PMMA), the largest deflection angle β is generally smaller than 50 degrees. Therefore, the diffusing portions 936 cannot completely eliminate dark areas formed adjacent the incident surface 932. In addition, some of the light beams can be reflected at the incident surface 932 of the light guide plate 930, thus a utilization efficiency of light energy of the backlight module 90 is decreased.

Figure 12:
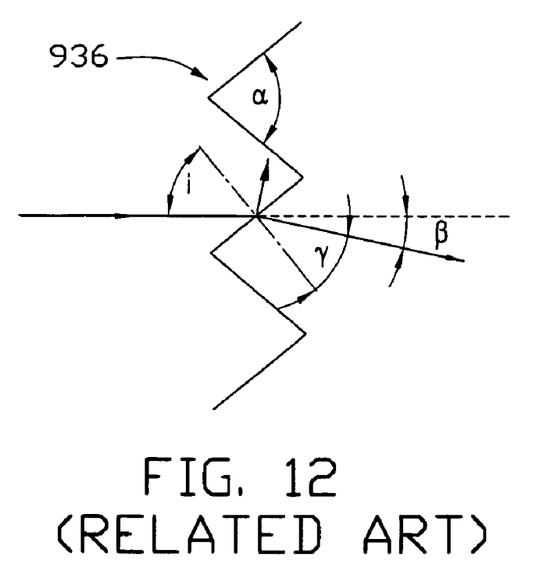
FIG. 12 is an isometric view of a still another conventional backlight module.

Referring to FIG. 12, a still another conventional backlight module 100 is shown. The backlight module 100 is similar to the backlight module 90, except that light diffusing portions 136 thereof are different from the diffusing portion 936 of the backlight module 90. The backlight module 100 includes a light guide plate 130 having an incident surface 132, an emitting surface 134, and a plurality of light diffusing portions 136. The light diffusing portions 136 are, particularly, a plurality of grooves defined in the incident surface 132. The diffusing portions 136 can also reduce the size of the dark areas formed adjacent the incident surface 132. However, similarly to the above described light guide plate 93, the diffusing portions 136 still cannot completely eliminate dark areas formed adjacent the incident surface 132. Some of the light beams can be reflected at the incident surface 132 of the light guide plate 130, thus a utilization efficiency of light energy of the backlight module 100 is decreased.

Figure 13:
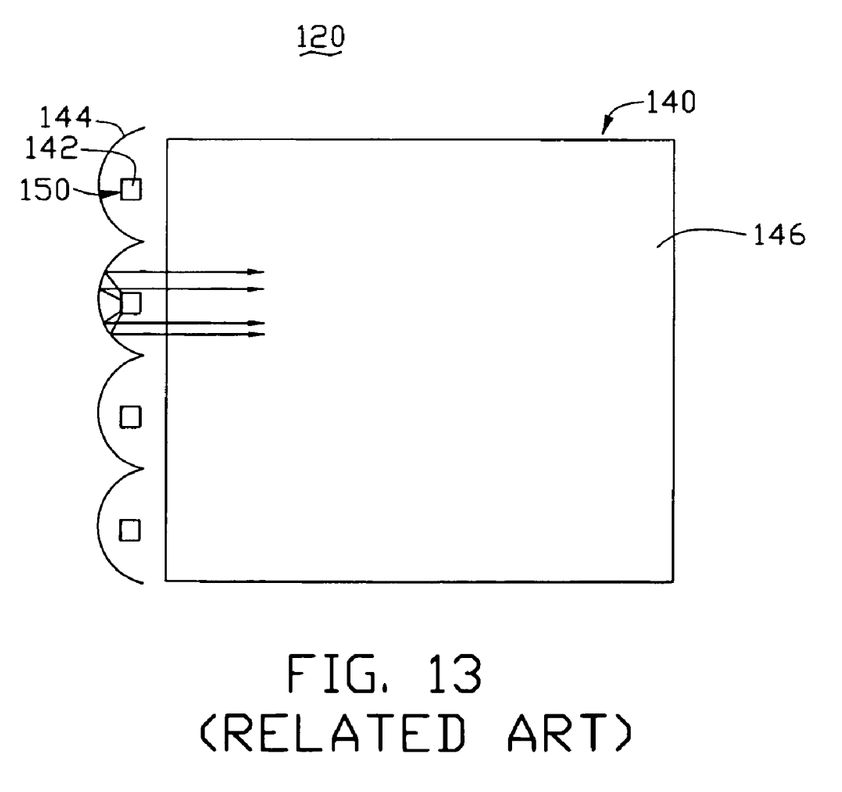
FIG. 13 is a schematic, top view of a further another conventional backlight module.

Referring to FIG. 13, a further another conventional backlight module 120 is shown. The backlight module 120 includes a plurality of LEDs 142, a light guide plate 140, and a reflector 144. The light guide plate 140 includes an incident surface 148, which faces the LEDs 142, and an emitting surface 146 adjoining the incident surface 148. The reflector 144 has a plurality of curved sections, each partly surrounding the respective LED 142. Each of the LEDs 142 has a luminescent surface 150 that faces the adjacent curved section of the reflector 144. Light beams, emitted from the LEDs 142, are redirected by the reflector 144 and enter into the light guide plate 140 through the incident surface 148 thereof However, some of the light beams are blocked by the respective LEDs 142, thereby preventing the light beams from reaching the incident surface 148 adjacent to the respective LEDs 142. As a result, a plurality of dark areas is formed in the light guide plate 140, adjacent the incident surface 148.

What is needed, therefore, is a backlight module which can completely eliminate the dark areas formed adjacent the incident surface of the light guide plate and is capable of improving a uniformity of illumination and a utilization efficiency of light energy.

SUMMARY

A backlight module includes a light guide plate having an incident surface, an emitting surface adjacent to the incident surface, and a reflective surface opposite to the emitting surface. At least one light source is disposed adjacent the incident surface. The light source has a luminescent surface; and at least one reflecting device is disposed adjacent the light source. The reflecting device has a reflective surface facing the incident surface. At least one semi-transmissive and semi-reflective film disposed on the incident surface of the light guide plate. The semi-transmissive and semi-reflective film and the reflecting device together are disposed for cooperatively reflecting some (i.e., a fraction) of the light beams emitted from the light source and redirecting the fraction of the light beams into the light guide plate through the incident surface, distant from the light source.

Other advantages and novel features of the present backlight module will become more apparent from the following detailed description of preferred embodiments, when taken in conjunction with the accompanying drawings.

BRIEF DESCRIPTION OF THE DRAWINGS

Many aspects of the present backlight module can be better understood with reference to the following drawings. The components in the drawings are not necessarily to scale, the emphasis instead being placed upon clearly illustrating the principles of the present backlight module.

Corresponding reference characters indicate corresponding parts throughout the several views. The exemplifications set out herein illustrate at least one preferred embodiment of the present backlight module, in one form, and such exemplifications are not to be construed as limiting the scope of the invention in any manner.

DETAILED DESCRIPTION OF PREFERRED EMBODIMENTS

Reference will now be made to the drawings to describe embodiments of the present backlight module, in detail.

Figure 1:
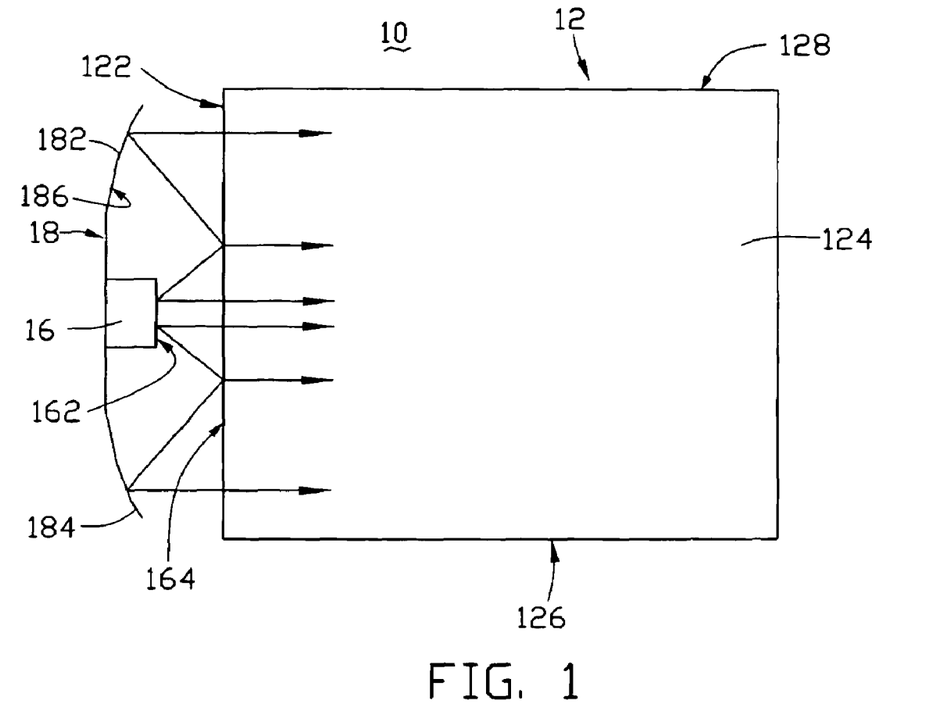
FIG. 1 is a schematic, top view of a backlight module, according to a first preferred embodiment of the present device.

Referring to FIG. 1, a backlight module 10, in accordance with a first preferred embodiment, is shown. The backlight module 10 includes a light guide plate 12, a light source 16, and a reflector 18. The light guide plate 12 is generally a flat sheet having a substantially rectangular shape, in plan view. The light guide plate 12 includes an incident surface 122, an emitting surface 124, and two main opposite side surfaces 126, 128. The light source 16 is disposed facing a center of the incident surface 122. The light source 16 has a luminescent surface 162 substantially parallel to the incident surface 122 of the light guide plate 12.

A semi-transmissive and semi-reflective film 164 is located on the center of the incident surface 122 and substantially faces the luminescent surface 162 of the light source 16. The semi-transmissive and semi-reflective film 164 is configured for partly reflecting the light beams emitted by the luminescent surface 162 of the light source 16. The reflector 18 is disposed around the light source 142 and adjacent to the incident surface 122. The reflector 18 includes two respective symmetrical and curved reflective parts 182, 184, at two edges thereof. The two curved reflective parts 182, 184 extend from two sides of the light source 16, respectively, relative to the incident surface 122. The reflector 18 has a curved reflective surface 186, which faces the incident surface 122, and is configured (i.e., structure and arranged) for uniformly reflecting the light beams reflected by the semi-transmissive and semi-reflective film 164 back toward the incident surface 122, thereby optically coupling the light beams into the light guide plate 12.

In the illustrated embodiment, the reflective surface 186 of the reflector 18 is smooth and can advantageously be made of a film of material selected from a group consisting of silver (Ag) and aluminum (Al). The light source 16 is a light emitting diode (LED). In order to cause the light beams reflected from the semi-transmissive and semi-reflective film 164 to be uniformly reflected into the light guide plate 22, a curvature of the two reflective parts 182, 184 should be chosen according to the configuration/positioning of the light source 16. That is, the curved (advantageously, parabolic) shape of the reflector 18 should be chosen so as to reflect any light beams incident thereupon so as to be essentially orthogonal to the incident surface 122.

Figure 2:
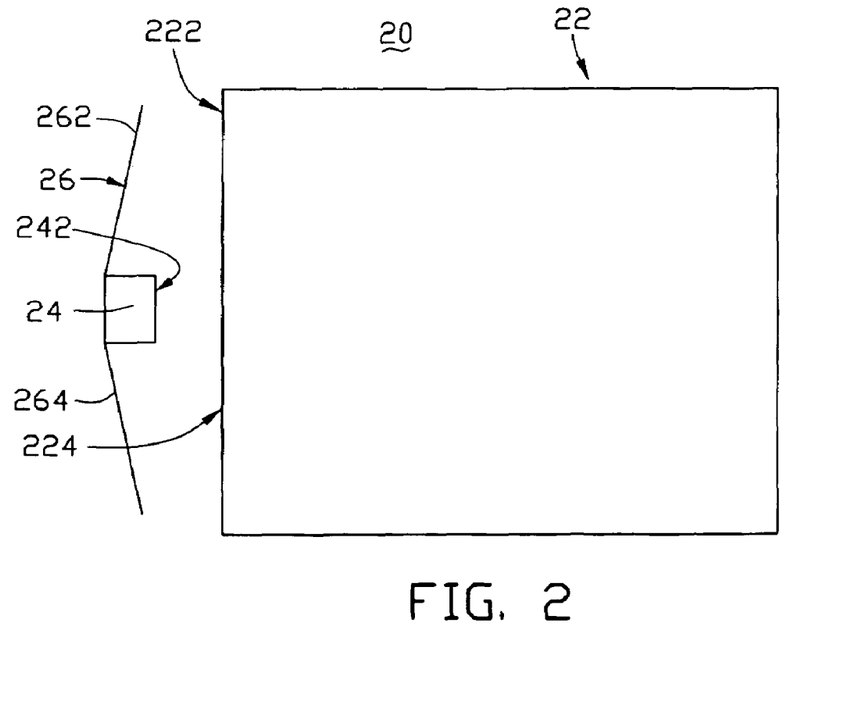
FIG. 2 is a schematic, top view of a backlight module, according to a second preferred embodiment of the present device.

The two curved parts 182, 184 of the reflector 18, according to a preferred embodiment, can be two separate parts surrounding the light source 16, respectively, or formed as an integrally part surrounding the light source 16. The reflector 18 may be assembled together with an LED light source 16, together acting as a special light source for the light guide plate 12. The primary function of the reflector 18 is to adjust the light energy distribution and achieve the uniform illumination on the incident surface 122. The semi-transmissive and semi-reflective film 164 located on the incident surface 122 substantially faces the emitting surface 162 of the light source 16. Some of the light beams emitted from the light source 16 pass through the semi-transmissive and semi-reflective film 164 and are optically coupled into the light guide plate 12. Some of the light beams, alternatively, are reflected by the semi-transmissive and semi-reflective film 164, and then reflected by the reflector 18 and finally optically coupled into the light guide plate 12 through the incident surface 122 at a lateral distance away from the light source 16. The light beams emitted from the light source 16 according to the preferred embodiment are transferred from the area adjacent to the light source 16 to the area away from the light source 16. This process eliminates the light column phenomena and improves the light distribution uniformity and utilization efficiency of light energy Referring to FIG. 2, a backlight module 20, in accordance with a second preferred embodiment, is shown. The backlight module 20 includes a light guide plate 22 having an incident surface 222, a light source 24, a semi-transmissive and semi-reflective film 224, and a reflector 26. The light source 24 has a luminescent surface 242 facing the incident surface 222 of the light guide plate 22. The semi-transmissive and semi-reflective film 224 is located on the center of the incident surface 222. The backlight module 20 is similar to the backlight module 10, except that the reflector 26 forms two inclined reflective parts 262, 264. The two inclined reflective parts 262, 264 extend from two respective sides of the light source 24.

Figure 3:
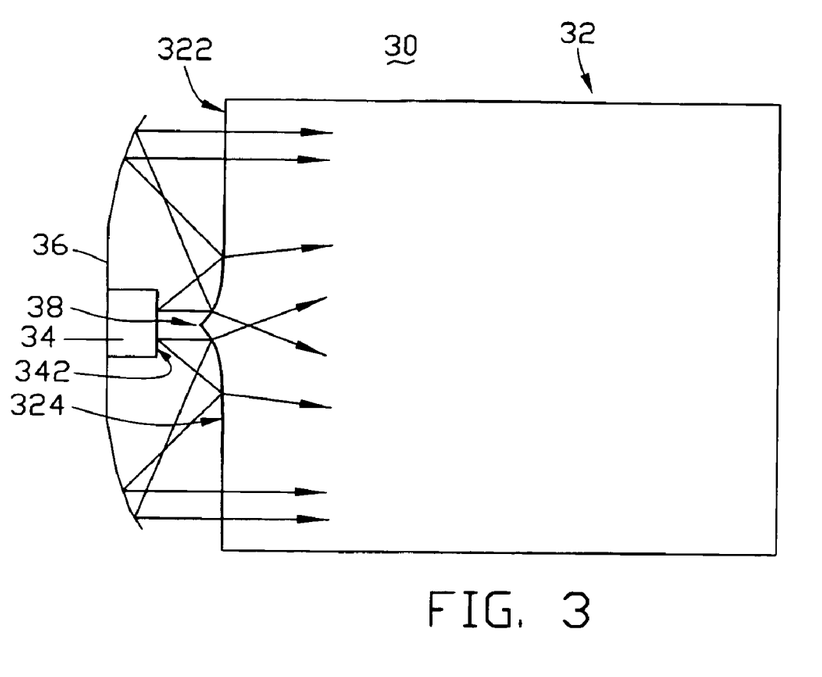
FIG. 3 is a schematic, top view of a backlight module, according to a third preferred embodiment of the present device.

Referring to FIG. 3, a backlight module 30, in accordance with a third preferred embodiment, is shown. The backlight module 30 includes a light guide plate 32 having an incident surface 322, a light source 34, a semi-transmissive and semi-reflective film 324, and a reflector 36. The light source 34 has a luminescent surface 342 facing the incident surface 322 of the light guide plate 32. The backlight module 30 is similar to the backlight module 10, except that the portion of the incident surface 322 substantially facing the luminescent surface 342 forms a protrusion 38. The protrusion 38 has two oppositely curved sidewalls/faces. The luminescent surface 342-reflective film 324 is located on the protrusion 38. This configuration reduces the brightness of the area of the incident surface 322 adjacent to the light source 34, while improving brightness at regions more distal thereto.

Figure 4:
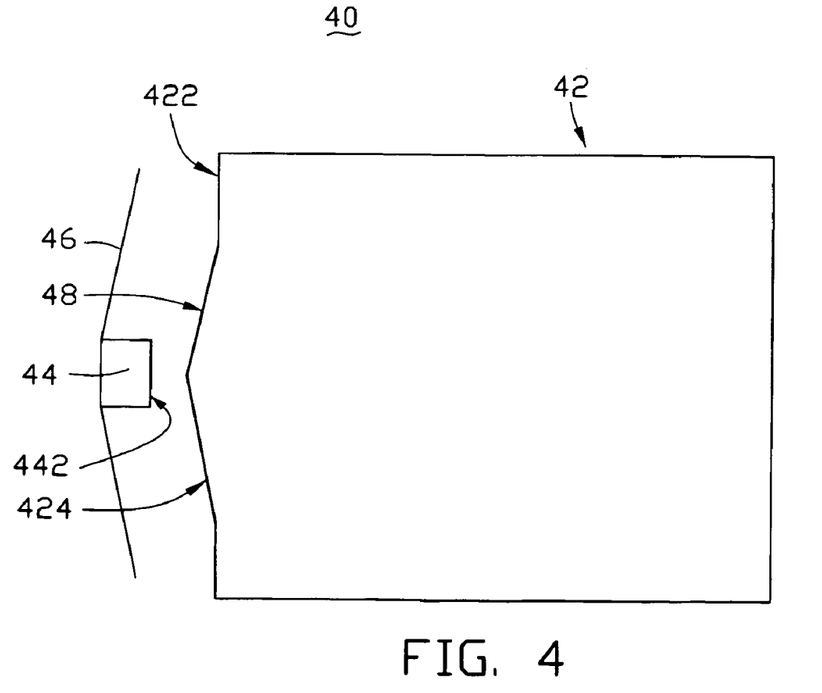
FIG. 4 is a schematic, top view of a backlight module, according to a fourth preferred embodiment of the present device.

Referring to FIG. 4, a backlight module 40, in accordance with a fourth preferred embodiment, is shown. The backlight module 40 includes a light guide plate 42 having an incident surface 422, a light source 44, a semi-transmissive and semi-reflective film 424, and a reflector 46. The light source 44 has a luminescent surface 442 facing the incident surface 422 of the light guide plate 42. The backlight module 40 is similar to the backlight module 20, except that the portion of the incident surface 422 substantially facing the luminescent surface 442 forms a protrusion 48. The protrusion 48 has two oppositely-angled, inclined plane sidewalls, and the semi-transmissive and semi-reflective film 424 is located thereon. This configuration reduces the brightness of the area of the incident surface 422 adjacent to the light source 44.

The protrusion of the incident surface of the third and the fourth embodiments may be in any other shape that suitably deflects a portion of the light away from the area of the incident surface 422 adjacent to a given light source 44. This configuration should reduce the brightness of the area of the incident surface adjacent to the light source. The semi-transmissive and semi-reflective film located on the protrusion advantageously transfers some of light energy from the area adjacent to the light source to the area away from the light source. The light guide plate with the protrusion and the semi-transmissive and semi-reflective film should reduce and may even eliminate the light column phenomenon, thereby achieve an improved light distribution uniformity on the incident surface. Accordingly, a good uniformity and good illumination of the light guide plate can be achieved.

Figure 5:
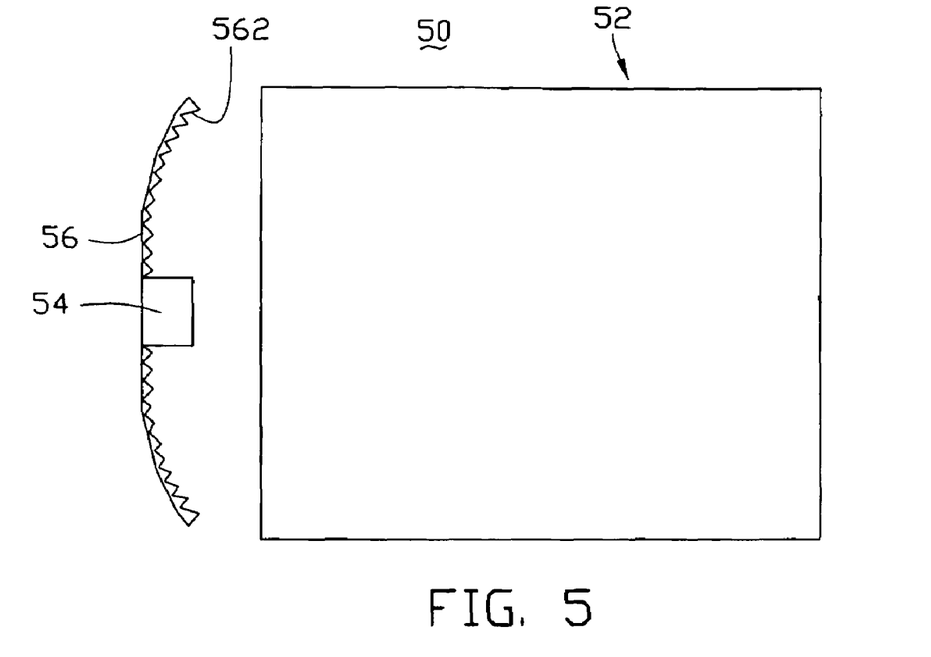
FIG. 5 is a schematic, top view of a backlight module, according to a fifth preferred embodiment of the present device.

As known of the brightness distribution of the light source, the structure of the reflector may be optimized to further improve the illumination uniformity. FIG. 5 shows a fifth embodiment of a backlight module 50. The backlight module 50 includes a light guide plate 52, a light source 54, and a reflector 56. The backlight module 50 is similar to the backlight module 10, except that the backlight module 50 further includes a plurality of microstructures 562 formed on the reflective surface of the reflector 56. A distribution density and size of the microstructures 562 are particularly provided so as to improve the light brightness uniformity of the light guide plate 52. The microstructures 562 may be, e.g., V-shaped projections (i.e., convexities), V-shaped grooves (i.e., concavities), and/or reflective dots. In the illustrated embodiment, the microstructures 560 are V-shaped projections.

It is to be understood that the reflective surfaces of the reflectors from the second to the fifth preferred embodiments may be formed with a plurality of microstructures as same as the above-described microstructures 562.

Figure 6:
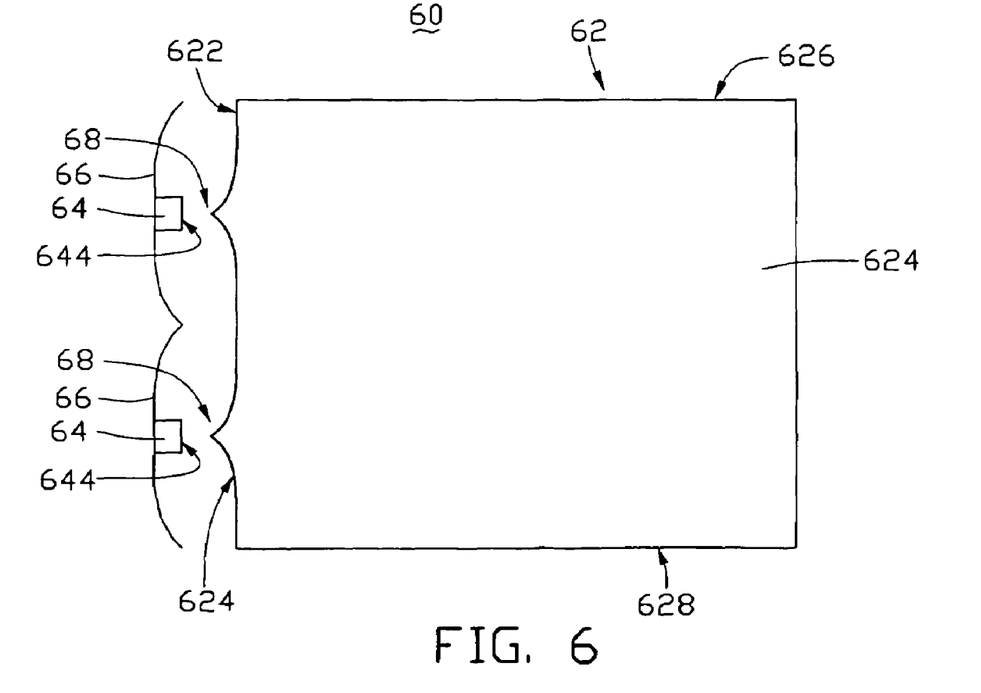
FIG. 6 is a schematic, top view of a backlight module, according to a sixth preferred embodiment of the present device.

Referring to FIG., 6, a backlight module 60, in accordance with a sixth preferred embodiment, is available and is an extension of the layout associated with the backlight module 10. The backlight module 60 includes a light guide plate 62, two light sources 64, two semi-transmissive and semi-reflective films 624, and two reflectors 66. The light guide plate 62 includes an incident surface 622, an emitting surface 624 adjoining the incident surface 622, and two main opposite side surfaces 626, 628. The incident surface 622 interconnects the two main opposite side surfaces 626, 628. Each of the light sources 64 has a luminescent surface 644 facing the incident surface 622. Each portion of the incident surface 622 substantially facing the luminescent surface 644 forms a protrusion 68. Each protrusion 68 has two oppositely curved sidewalls. The two semi-transmissive and semi-reflective films 624 are respectively located on a corresponding protrusion 68. The two reflectors 66 are respectively disposed adjacent to the incident surface 622. Each of the two reflectors 66 is arranged around one corresponding light source 64 and includes two symmetrically curved reflective parts. The two curved parts extend from two respective sides of a given light source 64, relative to the incident surface 622. Each reflector 66 thus has a curved reflected surface. The curved reflected surface faces the incident surface 622 and is configured (i.e., structured and arranged) for uniformly reflecting the light beams initially deflected/reflected by the corresponding semi-transmissive and semi-reflective film 624 back toward the incident surface 622, thereby optically coupling those light beams into the light guide plate 62. The two reflectors 66 together cover (i.e., extend over) the incident surface 622 completely. Accordingly, the light beams emitted from the light sources 64 can be uniformly reflected into the light guide plate 62 by the reflectors 66 through the incident surface 622. In addition, the reflective surfaces of the two reflectors 66 of this preferred embodiment may further have any kind of specialized microstructure, e.g., V-shaped projections, V-shaped grooves, or reflective dots, which is able to promote uniform light distribution.

Figure 7:
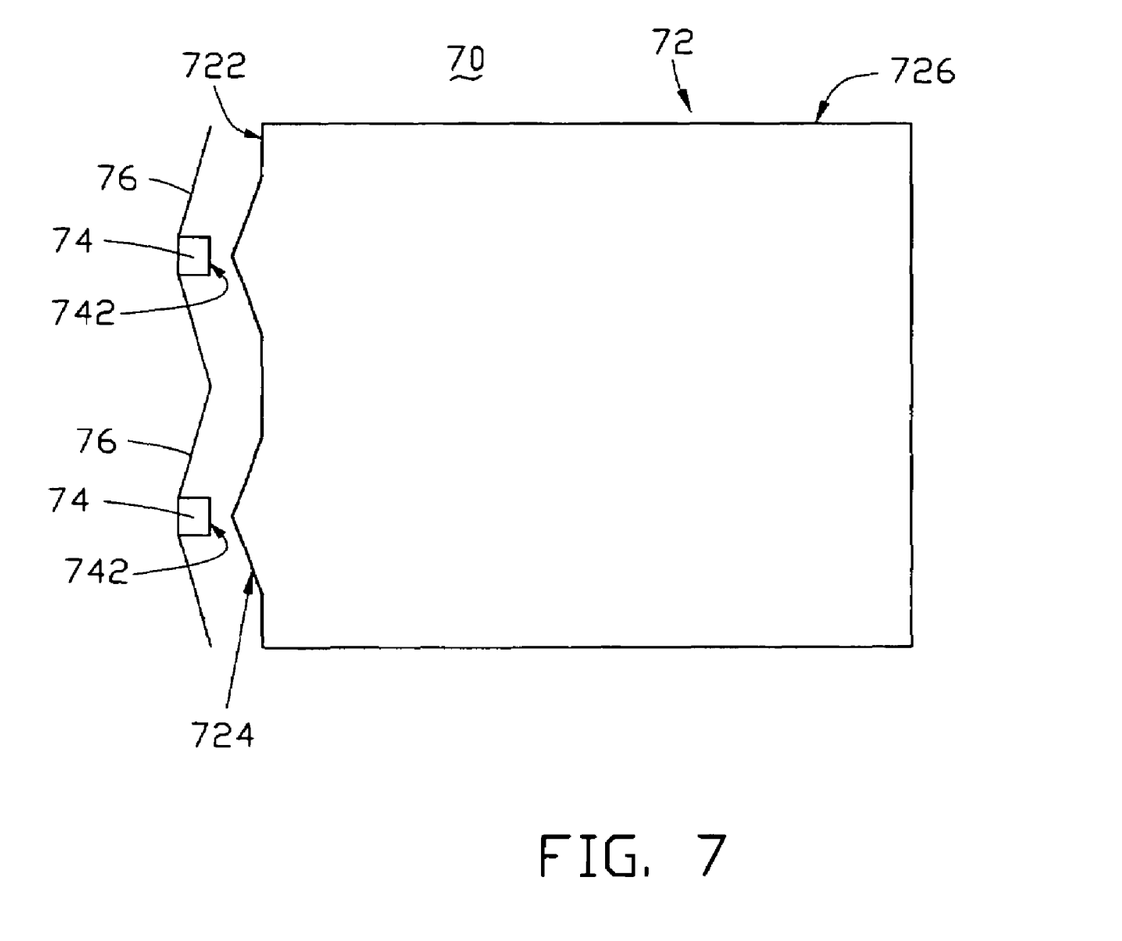
FIG. 7 is a schematic, top view of a backlight module, according to a seventh preferred embodiment of the present device.

Referring to FIG. 7, a backlight module 70, in accordance with a seventh preferred embodiment, is shown. The backlight module 70 includes a light guide plate 72 having an incident surface 722, two light sources 74, two semi-transmissive and semi-reflective films 724, and two reflectors 76. Each of the two light sources 74 has a luminescent surface 742 facing the incident surface 722 of the light guide plate 72. The backlight module 70 is similar to the backlight module 60, except that each reflector 76 forms two inclined reflective parts, and each portion of the light input surface 722 substantially facing the luminescent surface 742 forms a protrusion 78 with two inclined sidewalls. The two part-reflective films 724 are located on the corresponding protrusions 78, respectively. This configuration reduces the brightness of the area of the incident surface 422 adjacent to the light source 44.

It is noted that each of the incident surfaces of the sixth and seventh preferred embodiments, adopting two light sources, may be in a plane shape similar to the first embodiment. The protrusion portions of the incident surface may be disposed in any other of shapes that help promote the goal of uniform light distribution. The protrusion portion is configured for reducing the brightness of the area adjacent to the light source. Some light energy from the area adjacent to the light source can be transferred to the area away from the light source to eliminate the light column phenomenon and to improve the illumination uniformity and the utilization efficiency of light energy.

According to the present embodiments, a plurality of first microstructures may be further formed on the reflective surface, on the emitting surface, and/or on the assembly of two surfaces, in order to ultimately control the direction of the light beams being transmitted out through the emission surface of the given light guide plate. The first microstructure may be in shape of a triangle apex strip, an obtuse apex strip, a semicircle apex strip, a microdot, and the like. A plurality of second microstructures may be further formed on the incident surface to improve the distribution uniformity of incident light beams. Such second microstructures may be in shape of a sawtooth prism, a v-cut groove, and the like. The backlight module may further include a reflective sheet under the reflective surface for improving the light emitting efficiency and a diffusion sheet upon the emitting surface for improving the light distribution uniformity The shape of light guide plate, in any of the embodiments, may be flat or wedge-shaped. The light guide plate is, beneficially, made of a material selected from a group consisting of polymethyl methacrylate (PMMA), polycarbonate (PC), and any other suitable transparent resin material.

As mentioned above, the backlight module may be provided with at least one light source adjacent to the light input surface. The incident surface substantially faces the luminescent surface of the light source. The reflector and the semi-transmissive and semi-reflective film work together to reflect the light beams and then couple the light beams into the light guide plate through the incident surface. The configuration mentioned above may avoid forming the bright areas and the dark areas. The bright areas are formed due to the light source directly facing the incident surface. The advantage of the backlight module according to the present invention is to improve the illumination uniformity and the utilization efficiency of light energy.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

We claim:

1. A backlight module comprising:
   a light guide plate having an incident surface, an emitting surface adjacent to the incident surface, and a reflective surface opposite to the emitting surface;
   at least one light source disposed adjacent the incident surface, each light source having an luminescent surface;
   at least one reflecting device disposed adjacent a respective light source, each reflecting device having a reflective surface facing the incident surface; and
   at least one semi-transmissive and semi-reflective film disposed on the incident surface of the light guide plate, the semi-transmissive and semi-reflective film and the reflecting device being disposed for cooperatively reflecting a fraction of the light beams emitted from the light source and redirecting the fraction of the light beams into the light guide plate through the incident surface, distant from the light source.

2. The backlight module as claimed in claim 1, wherein the reflecting device comprises two reflective parts respectively extending from two corresponding sides of the light source.

3. The backlight module as claimed in claim 1, wherein the two reflective parts both are curved in shape or are inclined relative to the light source.

4. The backlight module as claimed in claim 1, wherein the incident surface comprises a protrusion adjacent and facing the luminescent surface of the light source.

5. The backlight module as claimed in claim 4, wherein the semi-transmissive and semi-reflective film is located on the protrusion.

6. The backlight module as claimed in claim 4, wherein the protrusion comprises one of a pair of oppositely-angled, planar faces and a pair of oppositely curved faces.

7. The backlight module as claimed in claim 1, wherein the reflecting device comprises a plurality of microstructures formed on the reflective surface thereof.

8. The backlight module as claimed in claim 7, wherein at least one microstructure is shaped into one of a V-shaped concave, a V-shaped convex, and a microdot shape.

9. The backlight module as claimed in claim 1, wherein the light guide plate comprises a plurality of microstructures formed on at least one of the reflective surface and the emitting surface thereof.

10. The backlight module as claimed in claim 9, wherein at least one microstructure has tone of a triangle apex strip shape, an obtuse apex strip shape, a hemispherical apex strip shape, and a microdot shape.

* * * * *